Jan. 5, 1965 D. E. WIEGAND 3,164,684

TRANSDUCER SYSTEM AND METHOD

Filed April 25, 1960 3 Sheets-Sheet 1

INVENTOR
DAVID E. WIEGAND

BY Hill, Sherman, Meroni, Gross & Simpson
ATTORNEYS

Jan. 5, 1965 D. E. WIEGAND 3,164,684

TRANSDUCER SYSTEM AND METHOD

Filed April 25, 1960 3 Sheets-Sheet 2

Inventor
DAVID E. WIEGAND by Hill, Sherman, Meroni, Gross & Simpson Attys.

Jan. 5, 1965 D. E. WIEGAND 3,164,684

TRANSDUCER SYSTEM AND METHOD

Filed April 25, 1960 3 Sheets-Sheet 3

Inventor
DAVID E. WIEGAND by Hill, Sherman, Meroni, Gross & Simpson Attys.

United States Patent Office 3,164,684
Patented Jan. 5, 1965

3,164,684

TRANSDUCER SYSTEM AND METHOD

David E. Wiegand, Villa Park, Ill., assignor to IIT Research Institute, a corporation of Illinois Filed Apr. 25, 1960, Ser. No. 24,477
15 Claims. (Cl. 179—100.2)

The present invention relates to electromagnetic transducing system and methods and is particularly directed to pulse energized electromagnetic transducer heads.

An object of the present invention is to provide an improved magnetic transducing system and method for recording and reproducing high frequency information such as video signals.

Another object of the invention is to provide an improved magnetic transducing head which is sensitive directly to magnetic flux rather than to the rate of change of magnetic flux.

Another object of the invention is to provide a novel pulse actuated magnetic recording and reproducing system.

Another object of the present invention is to provide an improved magnetic reproducing head and method providing a substantially higher signal output than conventional magnetic recording heads.

Still another object of the present invention is to provide a novel video recording and reproducing system.

Other objects, features and advantages of the present invention will be readily apparent from the following detailed description, taken in connection with the accompanying drawings, in which.

Figures 3, 4:
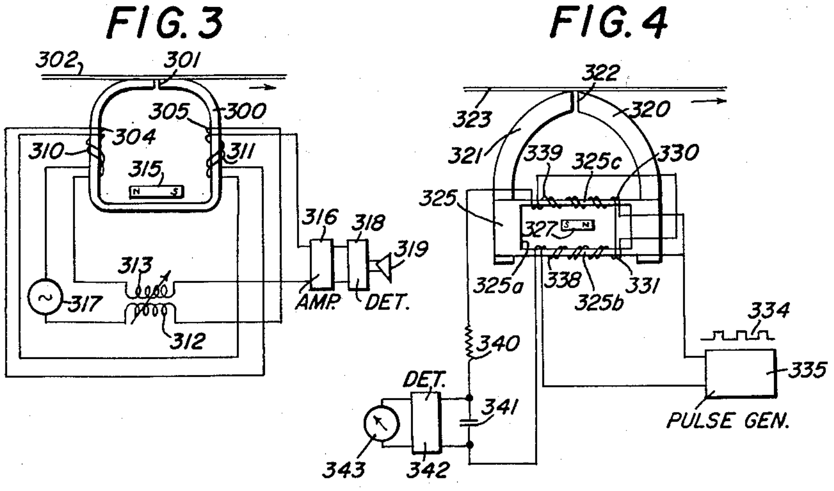
Figure 5:
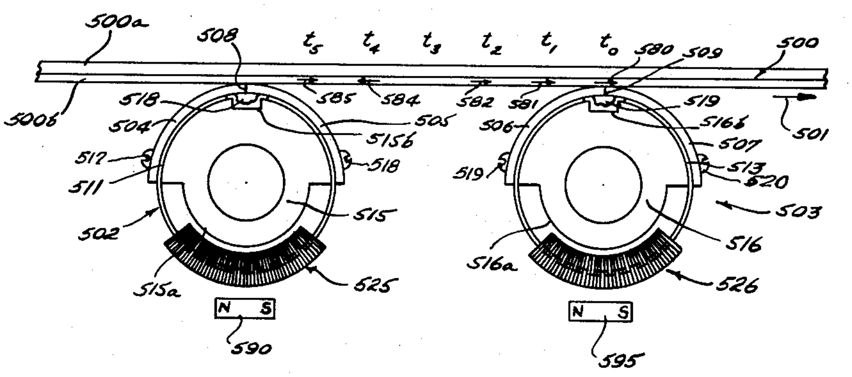
Figure 6:
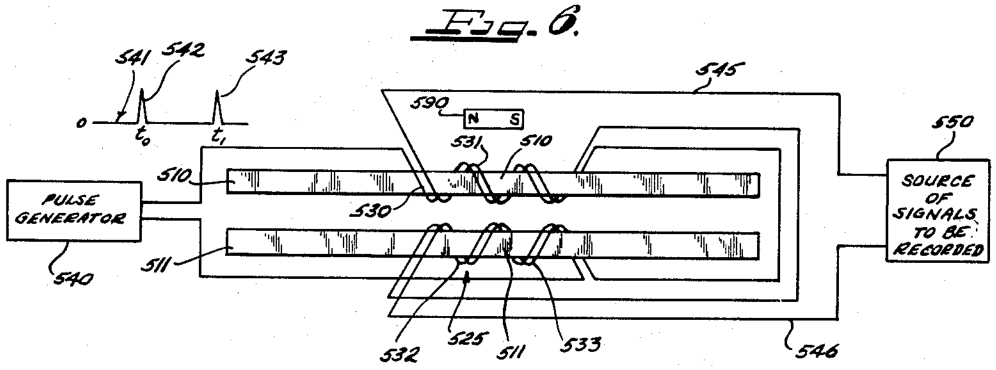
Figure 7:
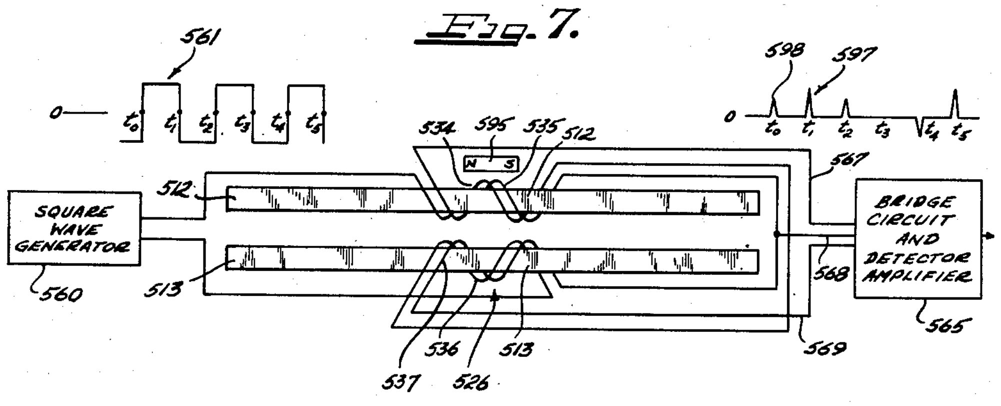
Figures 8, 9:
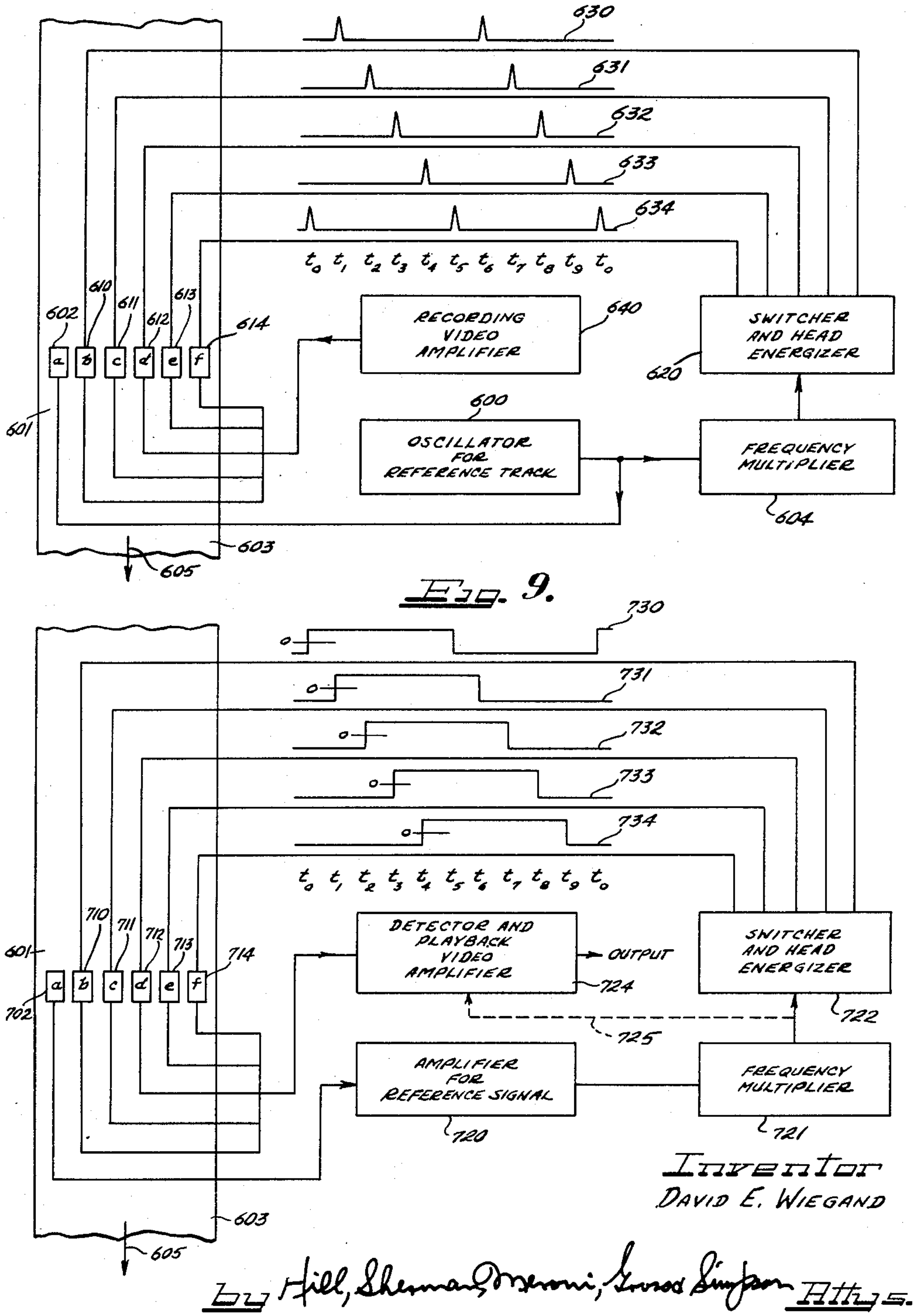

FIGURE 3 illustrates a modification also shown in my U.S. Patent No. 2,999,135 utilizing high frequency windings and connected in aiding relation with respect to the gap and operating on the incremental permeability characteristics of the record member, this type of head being claimed in my U.S. Patent No. 2,918,535 issued December 22, 1959;

FIGURE 4 illustrates a magnetic head excited by a high frequency pulse generator, this head being shown in my U.S. Patent No. 2,999,135, but being claimed herein;

FIGURE 5 is a somewhat diagrammatic illustration of a novel recording and reproducing system utilizing pulse excitation;

FIGURE 6 is a diagrammatic illustration of the principle of operation of the recording head of FIGURE 5;

FIGURE 7 is a diagrammatic illustration of the principle of operation of the playback head of FIGURE 5;

FIGURE 8 is a diagrammatic illustration of a suitable video recording system utilizing a head configuration such as illustrated in FIGURES 5 and 6; and FIGURE 9 illustrates a video playback system utilizing a head as illustrated in FIGURES 5 and 7.

Figure 1:
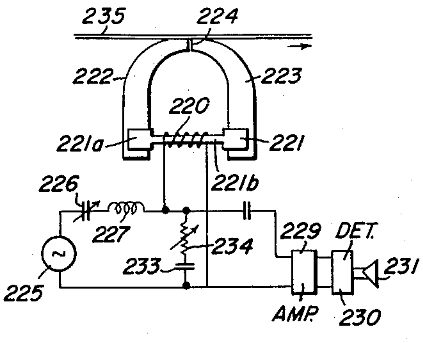
FIGURE 1 is a diagrammatic side elevation view of a head construction also shown in my prior application Serial No. 492,013, filed March 3, 1955, now U.S. Patent No. 2,999,135, issued September 5, 1961.

As shown on the drawings:

FIGURE 1 illustrates a head construction utilizing a single winding 220 all wound in the same direction on a saturating strip 221 bridging between a pair of pole pieces 222 and 223 defining a non-magnetic gap 224. The winding 220 is excited by means of an oscillator 225 through capacitance 226 and inductance 227 tuned to the fundamental frequency of oscillator 225. The output is taken from the winding 220 through an amplifier 229 tuned to twice the frequency of the oscillator 225, a suitable detector 230 and output device 231. Polarizing flux is introduced by means of battery 233 and resistor 234. It will be observed that the saturating strip 221 may have enlarged portions 221*a* engaging flatwise with the lower faces of the poles 222 and 223 to provide a complete loop magnetic circuit. This head construction has the disadvantage that the fundamental frequency component from the oscillator is not balanced out at the gap, so that the high frequency excitation must be adjusted to a value too low to cause erasure of the signal on record member 235. In practice, with a thin saturating strip portion 221*b*, it has been found substantially impossible to produce an appreciable erase field at gap 224.

It may be noted that in magnetic circuits where the saturating strips are in series, the strips may be twice as wide as where the strips are in parallel, providing a definite mechanical advantage in handling and fabrication of the strips. This is the result of the fact that all of the flux from the record member passes through each of the saturating strips. It may also be noted that with the embodiment of the ninth and tenth figures of my U.S. Patent 2,999,135, there is the advantage that the two winding portions may be formed from the same electrical conductor thereby avoiding the necessity for interconnecting two windings in series or parallel.

While the windings have been described as being energized by alternating electrical energy, other suitable excitation energy may be employed with corresponding modifications in the electrical output means for deriving an electrical signal from the resutlant flux variation in the head.

Figure 2:
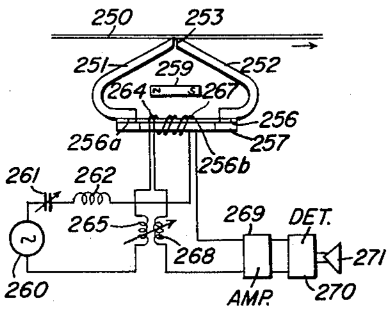
FIGURE 2 is a diagrammatic side elevational view of a further head construction also shown in my U.S. Patent No. 2,999,135 utilizing a unidirectional high frequency winding on a saturating strip.

Referring now to FIGURE 2, a further embodiment has been illustrated wherein a magnetized record member 250 travels across pole shoes 251 and 252 at the non-magnetic gap 253 therebetween, and the pole shoes have a thin saturating strip 256 with enlarged end portions 256*a* in flatwise engagement with the inturned ends of the pole shoes and a reduced cross section central portion 256*b* of similar outline to that shown at 221 in FIGURE 1. The thin saturating strip may be carried by a suitable non-magnetic support 257 of corresponding configuration and may be secured thereto as by a suitable cement for ease in handling of the saturating strip. Polarizing flux may be introduced by a very weak magnet such as indicated at 259 which in practice may comprise a magnetized piece of magnetic recording tape less than a quarter inch in width. The required value of polarizing flux has been found insufficient to affect the tape 250 at the gap 253. As previously described, the polarizing flux in the saturating strip is preferably greater than the maximum signal flux produced in the saturating strip by the record member 250. This same relationship holds true for the embodiment of FIGURE 1.

It will be observed in FIGURE 2 that the high frequency excitation is supplied from an oscillator 260 through condenser 261 and inductance 262 tuned to the fundamental frequency of the oscillator 260. The windings on the saturating strip are bifilar wound with one winding portion 264 connected in series with an inductance 265 and the high frequency oscillator 260, while the other bifilar winding portion 267 is connected in series with an inductance 268 and the input terminals of an amplifier 269 preferably tuned to an even order harmonic of the fundamental of oscillator 260. The output of the tuned amplifier 269 is fed through detector 270 to the output device 271 which may be a loud speaker. The inductances 265 and 268 are coupled in such a way as to balance out the fundamental component induced in the output winding 267, so that with no signal introduced at the gap 253, there will be no fundamental frequency component in the input circuit of tuned amplifier 269 including coils 267 and 268. It will be understood that as a signal flux is introduced into the saturating strip 256, the fundamental component in the input circuit to tuned amplifier 269 will be unbalanced and there will be a fundamental frequency component in the output circuit reflecting the signal on the tape 250. Thus, the amplifier 269 could be tuned to the fundamental frequency to obtain an output signal. However, tuning to the second harmonic of the oscillator frequency is preferred.

FIGURE 3 illustrates a ring type core 300 having a non-magnetic gap 301 for receiving a record medium 302 thereacross which is designed to operate without the use of a reduced cross-section saturating portion. In this embodiment, the core is preferably of relatively large cross-section and preferably of a magnetic material having a relatively linear B-H characteristics, such as "Conpernik" having a composition of 50% nickel and the remainder iron and minor constituents, or "Perminvar" having a composition of 25% cobalt, 45% nickel and the remainder iron and minor constituents. Further, in this embodiment, the high frequency windings 304 and 305 are preferably connected in series aiding relation with respect to the gap 301 so as to actually excite the magnetic material of the record member 302. The high frequency magnetic intensity at the gap 301 is preferably of a small amplitude in comparison with the coercive force of the record member. With such excitation, the magnetic material of the record member operates on a minor hysteresis loop, the incremental permeability of which depends on the residual magnetization of the portion of the record member at the gap 301.

In this embodiment it will be apparent that the head responds not to the external leakage flux from the record member, but to the actual internal magnetization of the record member. The signal flux acting on the head is thus independent of the recorded wave length of the signal so that a fundamental defect of heads relying on leakage flux from a record member is overcome. Signal pickup windings 310 and 311 may be bifilar wound with windings 304 and 305 respectively, and also in series aiding relation with respect to the gap 301. The oscillator circuit is provided with an inductance 312 and the pickup circuit is provided with an inductance 313 coupled therewith, so that the coupling between inductances 312 and 313 may be varied to balance out the fundamental component in the pickup circuit in the absence of a signal flux from the tape 302. Polarizing flux may be introduced by means of a magnet 315. An amplifier 316 has its input connected to the pickup circuit and is preferably tuned to an even order harmonic of the frequency of the oscillator 317. The output of the tuned amplifier 316 is connected through a conventional amplitude modulation detector and power amplifier unit 318 to an output device 319 such as a loud speaker.

In FIGURE 4, a magnetic head is illustrated having a pair of pole shoes 320 and 321 defining a nonmagnetic gap 322 receiving a record member 323 thereacross. A relatively thin flat member 325 of magnetic material bridges across the pole shoes 320 and 321 and is disposed in flatwise engagement with the ends of the pole shoes 320 and 321. The member 325 may have a window 325*a* therein to define a pair of thin saturating strips 325*b* and 325*c*. A magnet 327 is illustrated as applying polarizing flux to the strips 325*b* and 325*c*, the magnet being too weak to affect the record member 323. In this embodiment, windings 330 and 331 are excited by means of fluctuating electrical energy in the form of a series of unidirectional rectangular pulses such as indicated schematically at 334 from a pulse generator 335. The windings 330 and 331 are preferably connected in series opposing relation with respect to the gap 322 so that there will be no net exciting flux at the gap. Pickup windings 338 and 339 may be connected in aiding relation with respect to the gap 322 and be connected through an integrating circuit such as resistance 340 and capacitance 341 to a detector 342 and output device such as a meter 343. It will be understood that pulse operation of the head makes possible multiplex operation wherein a multiplicity of channels may be successively scanned by means of successive pulses to successive heads so as to reproduce a signal distributed across a multiplicity of channels. In this instance, each head would be pulsed at intervals as shown in FIGURE 4. In the illustrated embodiment, the output at 343 would consist of a series of pulses at the frequency of pulses 334 and varying in amplitude and polarity in accordance with the signal on the record member 323.

The twentieth figure of said Patent 2,999,135 illustrates the relation of output to the applied intensity of the magnetic field established in the saturating strips. This relationship is applicable to the embodiments of FIGURES 1 and 2.

With reference to the embodiments of FIGURES 1, 2 and 4, it has been found that for useful reproduction of music, with optimum amplitude of high frequency excitation as disclosed herein, the total cross-sectional area of the saturating strip or strips in each of these embodiments must be less than about $$\frac{50^{(B_tA_t+P+F)}}{B_s}$$

where $B_t$ is the maximum residual induction of the record member, $A_t$ is the cross-sectional area of the magnetized portion of the record member, P is the polarizing flux in the saturating strip, F is any feedback flux which may be introduced into the saturating strip, and $B_s$ is the intrinsic saturation induction for the saturating strip, the values being taken in consistent units. This limit of about $$\frac{50^{(B_tA_t+P+F)}}{B_s}$$

is the approximate maximum limit for useful reproduction of music since musical reproduction with cross sections appreciably above this limit produces a result which is usually unacceptable to the listener and to this extent represents the critical limit for useful reproduction.

Feedback is illustrated in the fourth figure of my Patent 2,999,135 as being taken at the output of a stage of amplification. It will be observed from the above formula that with positive feedback, and for a given signal-to-noise ratio, the maximum permissible area of the saturating strips is increased, while with negative feedback, the maximum permissible cross section is reduced. It has been found that the use of negative or inverse feedback is an effective way of improving the linearity, reliability, and stability of the heads of the present invention. With a sufficiently high feedback factor, all distortion and gain variations, except those in the tape recording itself and effects due to varying degree of contact between the tape and playback head, can be reduced to negligibly small effects. It was found that with the proper value of the feedback components, the net output signal from a constant level recording on tape was essentially unchanged in spite of artificially produced large changes in the gain of the amplifier.

For each of the embodiments of FIGURES 1, 2 and 4, the polarizing flux is preferably of magnitude greater than the maximum signal flux in the saturating strips.

For a useful signal-to-noise ratio for reproduction of music, it has been found that the area of the saturating strips must be less than 15 times the cross-sectional area of the magnetizable portion of the record tape where a polarizing flux is present and tape has a maximum flux capacity of approximately 1 maxwell. This limit is reduced by a factor of two where there is no polarizing flux and is reduced proportionately if the residual flux capacity of the tape is less than one maxwell, or increased proportionately if the flux capacity is greater than one maxwell. For example, for a flux capacity of .5 maxwell, the limit would be 7½ times the cross-sectional area of the magnetizable portion of the tape.

It has been found that for fine scanning of the record member, a small gap is required. This in turn tends to reduce the amount of flux linking the head and to require a relatively small saturating strip. With relatively small signal flux linking the saturating strip, it is advantageous to use a high frequency excitation in the saturating strip. However, core losses are not prohibitive at the high frequencies because of the small dimensions of the saturating strips. The present invention thus makes feasible a very fine scanning gap while providing the required high output level for a good signal-to-noise ratio.

It may be noted that negative feedback reduces the effective signal flux in the saturating strips, and thus allows for a further reduction in the minimum size of the strips for distortionless output. On the other hand, a positive feedback increases the permissible maximum size of the strips by effectively adding to the signal flux.

It will be understood that the heads illustrated in the drawings may be used for recording transversely of the tape, for example, with the gap at an angle other than a right angle to the path of travel of the tape or even parallel to the path of travel of the tape.

Further, the pole pieces may be offset parallel to the long dimension of the gap to provide closely abutting parallel gap surfaces which overlap for only a fraction of the total extent of the respective gap surfaces. This offset shoe construction in the head results in response to infinitely long wavelengths as well as good short wavelength resolution.

The embodiment of FIGURE 4 may be utilized in an electronic organ. In this application the pulsed head acts as a frequency changing device which reproduces the waveform of a recorded repeating signal at any desired frequency. With this system, there is required for each pitch of the organ a pulse generator, and a magnetic drum with recorded waveform is required for each stop of the organ. Thus, an organ with 73 pitches and 20 stops would have 73 pulse generators and 20 magnetic drums, a total of 93 basic elements replacing the 1460 pipes of an equivalent pipe organ.

With respect to the embodiment of FIGURE 2, the modulator strip 256 is cut to shape with the wide end portions annealed flat, and then cemented to a Bakelite stiffening piece such as indicated at 257. The coils are then wound on the strip assembly. With this construction procedure there is a minimum possibility of straining or otherwise damaging the modulator strips.

FIGURES 5, 6 and 7 illustrate a pulse energized recording and reproducing system. As illustrated, a magnetic tape record medium 500 travels in the direction of the arrow 501 successively across a pulse recording head assembly 502 and a pulse playback head assembly 503. The record member 500 may be a conventional tape record medium comprising a non-magnetic base **500*a* and a magnetizable layer 500*b* travelling in contact with pole members 504, 505, 506 and 507 defining respective non-magnetic gaps 508 and 509. The pole members may overlap the ends of respective saturating strips 510, 511, 512 and 513 which in turn are carried on non-magnetic cores 515 and 516. The pole members 504–507 may have a width of about a quarter inch and a length of a quarter inch and a thickness of .015 inch. The pole members have notches extending inwardly $\frac{1}{16}$ inch from the ends thereof remote from gaps 508 and 509 which receive clamping screws 517, 518, 519 and 520. The saturating strips 510, 511, 512 and 513 have a width of $\frac{5}{64}$ inch and a length of $\frac{7}{8}$ inch. The strips may have a uniform thickness of .001 inch and may be of "Molypermalloy" which may have a composition of 4% molybdenum, 79% nickel and the remainder iron and minor constituents. The cores 515 and 516 may be of brass and have an outside radius adjacent pole members 504–507 of $\frac{5}{32}$ inch, an outside radius of $\frac{1}{8}$ inch at surfaces 515*a* and 516*a* and an inside radius of .077 inch. The recording gap 508 and the playback gap 509 may be of a conventional size. For example the gaps may have a length in the direction of motion of the tape 500 equal to about .0005 inch filled by a .0005 inch thick copper shim. The brass cores 515 and 516 may be cut away as indicated at 515*b* and 516*b*, and the copper gap shims may be soldered integrally with the respective pole members 504, 505 and 506, 507 as indicated at 518 and 519 in FIGURE 5. The non-magnetic cores are cut away as indicated at 515*a* and 516*a* to accommodate windings such as indicated, at 525 and 526 in FIGURE 5. The pole members 504–507** may be of "Mumetal" which may have a composition of 5% copper, 2% chromium, 77% nickel and the remainder iron and minor constituents.

In forming the heads, the pole members 504–507 are annealed to proper curvature and the gap defining ends finish stoned. The ends are tinned and the gap shims put in place, after which the ends are soldered while pressing the ends together firmly to squeeze out excessive solder. The windings such as 525 and 526 may be pre-formed to an arcuate curvature and slipped over strips 510–513 prior to assembly of the strips and pole members and the cores.

It will be observed from FIGURES 6 and 7 that the winding assemblies such as 525 and 526 may each comprise a pair of bifilar wound conductor portions defining respective winding portions 530–537. The winding portions 530 and 532 are connected to a pulse generator 540 delivering an output wave form as indicated at 541 comprising a series of pulses such as indicated at 542 and 543 having a relatively short duration in comparison to the time interval between the successive pulses. The winding portions 531 and 533 are coupled by means of leads such as 545 and 546 to a source 550 of signals to be recorded.

In FIGURE 7, windings 534 and 536 are connected to a square wave generator 560 having an output wave form as indicated at 561. Windings 535 and 537 are connected to a bridge circuit and detector amplifier component 565 by means of leads 567, 568 and 569, lead 568 connecting to a common point between windings 535 and 537.

During recording as illustrated in FIGURE 6, the source of signals 550 supplies a continuous signal current to windings 531 and 533 in series, which windings set up aiding magnetomotive forces with respect to the magnetic circuit including gap 508.

The magnitude of the signal current, however, is such that any signal flux at the gap 508 resulting from the signal current is insufficient to appreciably magnetize the record medium 500. In the absence of any signal current from the source 550, pulses such as 542 and 543 from the pulse generator 540 are also insufficient to produce a permanent magnetization of the record medium since windings 530 and 532 generate magnetomotive forces which are opposed and balanced with respect to the loop magnetic circuit including the gap 508. At the coincidence, however, of a signal from the source 550 and a pulse from pulse generator 540, the signal from source 550 produces a magnetomotive force which aids the pulse magnetomotive force in one reduced cross section portion and opposes the pulse magnetomotive force in the other section. The signal magnetomotive force while being substantially less than the amplitude of the pulses 542 and 543 is a substantial proportion of the pulse amplitude so as to appreciably unbalance the system and enable a pulse magnetomotive force to appear at the gap 508 of polarity related to the polarity of the signal from source 550. The system of FIGURE 6 may be thought of as illustrating the operation for one channel of a multi-channel recorder, the particular channel illustrated being activated each time a pulse such as 542 or 543 is received, while the output of the source 550 which may have a continuously varying wave form which may be supplied continuously to each of the heads of the system, the wave form being sampled by each of the channels in succession by means of sequentially offset pulses to the successive channels. The duration of each sampling may be a fraction of the time corresponding to the minimum wave length recordable on the record medium 500; however, because of limitations of effective scanning widths and of coercivity in the tape medium this short slug of information is smeared out in the recording process. The magnitude of the signal put on the tape, however, is proportional to the magnitude of the signal to be recorded at the instant of sampling and the required short time increment is automatically restored in the playback process as will be described hereinafter.

In recording in the absence of a signal, for example at time $t_3$ in FIGURE 5, because of the balanced nature of the pulse circuit, the magnetic flux due to the current pulse takes the local path through strips 510 and 511 in series. However, for times such as $t_0$, $t_1$ and $t_2$ in FIGURE 5 where current is flowing in the signal windings 531 and 533, the magnetic head system becomes unbalanced and saturation effects cause pulses of magnetomotive force to appear across the recording gap 508 which are recorded on the tape as indicated by the arrows 580, 581, 582, 584 and 585 in FIGURE 5 corresponding to times $t_0$, $t_1$, $t_2$, $t_4$ and $t_5$. It will be understood that a pulse such as 542 and 543 arrives at the windings 530, 532 at each of the successive times $t_0$, $t_1$, $t_2$, $t_3$, $t_4$, $t_5$, etc. which times may be equally spaced. The strength of the magnetomotive force appearing at the recording gap at each of these times depends on the amount of unbalance and consequently on the strength of the signal current in the recording windings 531, 533. In order to approach linearity between recording current and recorded flux on the record medium, it may be desirable to supply bias in the form of a direct current in the signal windings 531, 533 or in the energizing windings 530, 532 as in the previous embodiments; or bias may be supplied by an external magnet as indicated at 590 or by prepolarizing the tape 500 at the time the tape is erased prior to the recording process. The bias flux in each of the strips 510 and 511 would be in the same direction with respect to the loop circuit including the gap 508 but would be of too low a value to be recorded directly on the magnetic record medium. On the other hand, the steady unidirectional bias flux would normally have a value exceeding the maximum value of the signal flux to be introduced into the circuit, and might have a value of the order of one-third of the saturation value of flux for the strips 510 and 511. In this case, the signal flux from the signal source 550 would have a value less than one-third the value of saturation flux for the strips 510 and 511, and the pulses such as 542 and 543 would provide sufficient amplitude to drive at least one of the core sections 510 and 511 into saturation when added to the bias flux. The pulses may preferably have amplitudes exceeding that corresponding to saturation of the saturating strips.

It will be understood that the recording system of FIGURE 6 may be utilized with any of the embodiments of FIGURES 1, 2, 3 and 4 and any of the first through nineteenth and twenty-first figures of my U.S. Patent 2,999,135 by connecting the pulse generator 540 to the winding portions which are opposing with respect to the loop magnetic circuit including the gap and connecting the source of signals to be recorded to the winding portions which are in series aiding relation with respect to the loop magnetic circuit including the gap. In this way, any of the preceding embodiments may be utilized as recording heads. FIGURE 3, however, is an exception to this where the core provides a linear magnetization characteristic for the excitation and signal values applied.

In the playback mode of operation, each time the square wave form current from the square wave generator 560 crosses the zero axis a pulse is generated in the output windings 535, 537. With unmagnetized tape over the gap, the magnetic flux due to the current in the energizing windings 534 and 536 takes the local path through strips 512 and 513 in series. Under this condition, in the absence of any unbalancing polarizing flux from the permanent magnet 595 the fluxes in the two constricted sections 512 and 513 are equal. With the polarity of connections used in the signal coils 535, 537, the induced voltages therein cancel out, and no voltage appears at the signal terminals. This condition is indicated at time $t_3$ in the output wave form of 597 at the output of the bridge circuit and detector amplifier 565. However, when a magnetized section of tape is over the scanning gap as indicated for the section 580 in FIGURE 5, the circuit becomes unbalanced and magnetic saturation effects cause differences in fluxes in the two sections 512 and 513 and a net induced voltage appears at the signal terminals, for example corresponding to the magnetization of section 580 in FIGURE 5 and as represented by output pulse 598 in FIGURE 7. The induced voltage depends in magnitude on the steepness of rise and fall of the current in the energizing windings 534, 536, and by proper design of the components can be made much larger than the induced voltage caused by the flux direct from the tape. Under this condition the induced voltage at the signal terminals is essentially zero, except for the short periods of rise and fall of current from the square wave generator 560. Evidently the magnitudes of these voltages spikes from the component 565 depend on the degree of magnetic unbalance and therefore on the magnetic strength of the section of tape over the scanning gap. Thus, the output pulses represented by the wave form 597 in FIGURE 7 follow the input wave form, it being assumed that the pulses at times $t_0$, $t_1$, $t_2$, $t_3$, $t_4$, $t_5$, etc. in the wave form 561 of FIGURE 7 occur at the times the recorded magnetization elements 580–585 arrive at the playback head 503.

With a playback head that is perferctly symmetrical magnetically, the output from the head should be zero with unmagnetized tape at the gap 509 and in the absence of any polarizing flux. With magnetized tape over the gap, the output should be a series of sharp pips in synchronism with the reversals of the square wave current indicated at 561. The height of the pips should depend on the magnetic strength of the tape over the gap and on the rate of change of current during reversals of polarity in the square wave form 561. The duration of the output signal pips depends on the time required for current reversal in the square wave and is entirely independent of wave length of the recorded signal on the tape or the speed of motion of the tape.

The playback head of FIGURE 7 reproduces the magnetic state of the particular element of recording medium at the gap 509 whether the tape is moving or stationary, the output signal being essentially the same for both cases. For slow tape speeds, the output signal level is much higher than would be obtained from a direct induction type pickup head. The head serves the additional purpose of a pulse sharpener. That is, the length of the pulses in the output circuit of the head is determined solely by the characteristics of the square wave excitation current indicated at 561 in FIGURE 7.

The pulse sharpening action should be useful in a memory device. For example, consider the case in which it is desired to store information which is coming out of a computer at a speed much higher than can be recorded on a single magnetic channel. This information could be taken out of the machine at high speeds by dividing it among several magnetic channels. In attempting to put this information back into the machine at high speed at a later time trouble would be experienced due to overlapping of information from one channel to another because of scanning limitations with the conventional playback system. With the present system, however, the original sharpness of the data would be restored by the pulse sharpening effect of the playback head.

In cases where it is necessary to switch rapidly from one head to another this can be done without mechanical switching of the signal circuit by supplying current pulses to energize the heads in proper sequence.

A magnetic playback head such as illustrated in FIGURES 5 and 7 was tested with a square wave generator applying the square wave excitation to the windings as illustrated in FIGURE 7. It was found that the signals appearing at the output of the head consisted of a series of sharp pips as expected. However, the height of the pips did not go to zero with unmagnetized tape over the gap. A condition of dissymmetry in the head structure was indicated. Improved performance was obtained by connecting the signal windings in the head in a bridge circuit as indicated by the component 565 in FIGURE 7, and varying the balance control of the bridge and simultaneously adjusting the position relative to the head of a permanent magnet such as indicated at 595 for optimum balance. With saturating strips of cross section at least about five times larger than optimum, changes of about ±50% of the no-signal pip height were observed when a magnetized section of tape was moved across the gap. It is considered that a reduction of the cross sectional area to provide a signal flux in the saturating sections 512 and 513 of approximately ⅓ the saturation flux for the sections will provide an important improvement in the full signal to no-signal output ratio. Experience indicates that by reducing the cross section of the core sections 512 and 513 in relation to the maximum signal from the tape so that the maximum signal flux in the sections is approximately ⅓ to ⅔ of saturation flux for the material of the sections, undesired effects such as noise and residual signals are greatly decreased in relation to the useful signal. A total cross section for strips 512 and 513 of approximately 30 square mils (1 mil=.001 inch), 15 square mils per section 512 and/or 513 is near the critical size for a one-quarter inch wide tape where the strips 512 and 513 are of "Molybdenum Permalloy." The balance problem in pulse excitation is more severe than with sinusoidal operation. Nevertheless linear unbalances, such as unbalance in the direct coupling between the excitation and signal output windings is subject to elimination by: (*a*) use of a completely symmetrical coil system (electromagnetic and electrostatic balance between coils and to ground); (*b*) in the single unit modulator head such as shown in the ninth and tenth figures of my Patent 2,999,135, adjustment of the position of the outer coil 194 relative to the inner winding 190; and (*c*) use of external balance trimming adjustments.

The saturating strips 512 and 513 as described for FIGURE 7 have a total cross section of approximately 156 square mils which is at least about five times the ideal size coordinated to the maximum tape signal of about one maxwell. Further, the relatively complex construction of this head assembly as compared with that of the ninth and tenth figures of my Patent 2,999,135 makes for greater unbalance. In spite of these limitations, when the head of FIGURES 5 and 7 was used with an external balancing arrangement in the form of bridge circuit 565 and was excited by square wave pulses as indicated at 561, output signal wave forms were obtained which distinguished between the tape conditions (*a*) positive polarity, (*b*) negative polarity, and (*c*) unrecorded tape.

Accordingly, it is considered that an optimum arrangement for pulse reproduction resides in the utilization of the head configuration of the ninth and tenth figures of said Patent 2,999,135. The 30 square mil optimum cross section for the two saturating strips together is on the basis of a maximum flux capacity of the tape of approximately one maxwell and an intrinsic saturation induction (B minus H) of approximately 8700 gausses for "Molybdenum Permalloy." Thus, for optimum operation in FIGURE 7, the strips 512 and 513 should have a thickness for example of .001 inch (1 mil) and a width each of .015 inch (15 mils) to provide the total cross section of 15 square mils. In the ninth and tenth figures of my Patent 2,999,135 when a square wave is supplied to the winding, the strip should have a cross section of about 30 square mils if its saturation induction is about 8700 gausses and tape output about one maxwell.

The square wave form 561 in FIGURE 7 may have positive and negative amplitudes approaching and preferably exceeding an amplitude corresponding to saturation of the strips 512 and 513. In FIGURE 4, the wave form 334 may fluctuate between a zero base level and an amplitude corresponding to saturation of the strip portions *325b* and *325c*. The portions *325b* and *325c* should have cross sections related to the maximum signal flux from the tape 323 as described in connection with FIGURE 7.

FIGURE 8 illustrates a recording system utilizing heads such as shown in FIGURES 5 and 7, and FIGURE 9 shows a video playback system using playback heads such as indicated in FIGURES 5 and 7. It will be understood, however, that preferably the saturating strips 512 and 513 of the playback head have a total cross section of 30 square mils. Preferably also a single loop configuration such as shown in the ninth and tenth figures of my patent 2,999,135 is used. Noise experiments indicate that in a playback head of the type shown in said ninth and tenth figures for use with a full one-quarter inch wide track on tape, optimum dynamic range is obtained if the strip of "Molybdenum Permalloy" is .001 inch thick and 1/32 inch wide, for example, where a polarizing flux is superimposed on the maximum signal from the tape.

In the recording system of FIGURE 8, the oscillator 600 operates at a fixed frequency which is coordinated with the tape speed in such a way that a wave length near the minimum possible reliable wave length is recorded on the track indicated at 601 by recording head *a* which is also designated by the reference numeral 602. This is the reference or timing track. The output of oscillator 600 also supplies a frequency multiplier 604 which multiplies the frequency by a factor equal to the number of signal heads such as indicated at 610–614 coacting with the tape 603 which moves in the direction of the arrow 605. The output of the frequency multiplier 604 controls the switcher and head energizer component 620 which supplies pulses as indicated by waveforms 630–634 to the heads 610–614 in synchronism with the output of the frequency multiplier 604.

The video signals to be recorded are supplied simultaneously and continuously to all the signal recording heads 610–614 from the recording video amplifier component 640. With the type of head shown in FIGURES 5 and 6, however, the head is active as a recorder only during the very short time during which a pulse is being applied to its exciting windings such as windings 530, 532 in FIGURE 6.

There is thus provided a system of sampling the video signal and the duration of each sample is a fraction of the time corresponding to the minimum wave length recordable on the tape. Because of limitations of effective scanning widths and of coercivity in the tape medium this short slug of information is smeared out in the recording process. The magnitude of signal put on the tape, however, is proportional to the magnitude of the video signal at the instant of sampling and the required short time increment is automatically restored in the playback process.

With the illustrated output from the head energizer 620, at time $t_0$, head 614 will record the instantaneous information from the recording video amplifier 640. At the next instant of time $t_1$, head 610 will be activated; at time $t_2$, head 611 will be activated; at time $t_3$, head 612 will be activated and so forth.

In the playback system illustrated in FIGURE 9, playback heads 702 and 710–714 may preferably have a structure as described in connection with the ninth and tenth figures of my Patent 2,999,135, and may be operated as described in connection with FIGURES 5 and 7. The same head configuration may be utilized for recording and playback with different electrical connections as indicated in FIGURES 8 and 9. On the other hand, because of the differences in excitation signals to the heads, it may be desirable to utilize separate sets of heads for recording and playback. The constant frequency recording on track 601 is picked up by playback head 702 and amplified by amplifier 720. The output of this amplifier feeds the multiplier 721 which in turn controls the switchers and head energizer component 722. The frequency multiplier may also feed a control signal to the detector following the playback video amplifier in the detector and playback video amplifier component 724 as indicated by the dash line 725 in FIGURE 9. The output of the switcher and head energizer component 722 may be the rectangular wave forms indicated at 730–734, these wave forms corresponding to the wave form 561 in FIGURE 7. Each time the exciting windings such as 534, 536 in FIGURE 7 of one of the heads receive a reversal in the polarity of current flow thereto, the instantaneous magnetization on the tape 603 at the channel associated with the head is sampled and the output is delivered to the detector and playback video amplifier component 724. The energizing windings of the pickup heads thus carry currents of constant value whose direction of flow is reversed sequentially in heads 710–714 as indicated by the wave from patterns 730–734.

The signal windings such as 535, 537 in FIGURE 7 of the playback heads 710–714 are permanently connected to the input of the signal playback video amplifier component 724. However, with the special type of head used, each playback head responds to a signal on the tape only during the extremely short periods of time during which the polarity of the exciting current in the energizing windings is in the process of reversing. The playback system thus provides a system for restoring the incremental nature of the information samples taken from the original video signal in the recording process. The short-time characteristics are restored in the playback process through the short period of activation of the playback heads.

It is evident that the relative timing between tracks is dependent primarily on refinements in electronic techniques rather than depending on impossible mechanical tolerances. As stated previously, the original short-time signal samples are smeared out in the recording process. There is also further smearing in the playback process because of similar scanning limitations. Mechanical tolerances need only be sufficient so that the proper smeared-out slug of information is over a playback head at the instant of its energization. It is not necessary that the playback head be energized at the center of the smeared-out slug. Thus, the required accuracy in putting the information from the several recorded tracks into a single channel is provided primarily by stability in the amplifier for reference signal component 720 and in the electronic elegance in the frequency multiplier component 721 and the switcher and head energizer component 722.

Recording and playback systems of the type described should provide much greater flexibility and usefulness in computer applications than the conventional type of magnetic recording heads. The fact that the heads are energized only when the energizing windings are pulsed makes possible a very rapid switching sequence when a large number of heads are used. The fact that the state of magnetization of an element of tape can be determined with the tape stationary or moving should be advantageous.

The heads can be used on multi-channel tape with perhaps a number of heads on each channel depending on the number of applications. By suitable modifications, magnetic structures similar to the heads of FIGURES 5–7 can be used as static memory elements. In this case, the tape record medium is replaced by a length of high coercive force magnetic material bridging the gap between the ends of the saturating strips.

It will be apparent that many modifications and variations may be effected without departing from the scope of the novel concepts of the present invention.

The present application is a continuation-in-part of U.S. Serial No. 492,013, filed March 3, 1955, now U.S. Patent No. 2,999,135, issued September 5, 1961.

I claim as my invention:

1. A recording head comprising magnetic core means having a magnetic signal flux path including a recording gap for coupling with a magnetic record medium and including variable reluctance portions of magnetic material, signal coupling means coupled to said magnetic signal flux path, means whereby said signal coupling means produces a signal flux in said magnetic signal flux path which is ineffective by itself to permanently substantially affect a magnetic record medium at said recording gap, excitation coupling means coupled to said variable reluctance portions, means for delivering current pulses to said excitation coupling means to generate exciting fluxes in the respective variable reluctance portions which are opposed with respect to said magnetic signal flux path and substantially balanced at said gap to produce a net magnetic flux at said gap which is ineffective by itself to substantially permanently affect a magnetic record medium at said gap, means whereby said variable reluctance portions are maintained in a magnetic condition substantially below saturation and are periodically shifted by said magnetic exciting fluxes to net magnetic flux densities of respective opposite polarity with respect to said magnetic signal flux path, and means whereby a signal flux from the signal coupling means is effective to unbalance said opposed magnetic exciting fluxes and to produce a recording on said record medium in accordance with said signal flux.

2. A recording head comprising magnetic core means having a magnetic signal flux path including a recording gap for coupling with a magnetic record medium and including variable reluctance portions of magnetic material, signal coupling means coupled to said magnetic signal flux path, means whereby said signal coupling means produces a signal flux in said magnetic signal flux path which is ineffective by itself to permanently substantially affect a magnetic record medium at said recording gap, excitation coupling means coupled to said variable reluctance portions, means for delivering current pulses to said excitation coupling means to generate exciting fluxes in the respective variable reluctance portions which are opposed with respect to said magnetic signal flux path and substantially balanced at said gap to produce a net magnetic flux at said gap which is ineffective by itself to substantially permanently affect a magnetic record medium at said gap, means whereby said variable reluctance portions are maintained in a magnetic condition substantially below saturation and are periodically shifted by said magnetic exciting fluxes to net magnetic flux densities of respective opposite polarity with respect to said magnetic signal flux path, and means whereby a signal flux from the signal coupling means is effective to unbalance said opposed magnetic exciting fluxes and to produce a recording on said record medium in accordance with said signal flux, said variable reluctance portions having a saturation flux capacity of the order of three times the saturation flux capacity of the magnetic record medium coupled with said magnetic signal flux path.

3. The method of recording which comprises establishing periodic excitation pulses in respective portions of a magnetic circuit which are opposed and substantially balanced with respect to a recording gap in the circuit, moving a magnetizable record medium into coupling relation to said recording gap, and introducing a signal flux in said magnetic circuit for effectively unbalancing the opposed excitation pulses and thereby producing a net magnetic flux at said recording gap of polarity in accordance with the signal flux for recording on the magnetizable record medium.

4. The method of transducing intelligence signals which comprises moving a magnetic record medium into coupling relation to a plurality of magnetic signal flux paths, the respective magnetic signal flux paths each having an electric signal path coupled therewith for transducing between an electric current flow along said electric signal path and a magnetic signal flux threading said magnetic signal flux path, normally maintaining interlinkage between said magnetic record medium and said electric signal paths ineffective to transduce signals therebetween, and supplying excitation pulses to the respective magnetic signal flux paths in succession to successively activate transducing operations between the record medium and the respective electric signal paths.

5. In a recording system, a series of recording head units each comprising recording core means cooperating with a respective portion of a magnetic record medium, signal coupling means coupled to each of said recording core means, recording signal source means connected to all of said signal coupling means in common for delivering a signal to said signal coupling means and producing a corresponding signal flux in each of said recording core means simultaneously, said signal source means producing a signal flux in each of said recording core means which is of too low an amplitude at the magnetic record medium to be effectively recorded thereon, and excitation means for producing pulses of magnetic flux in the recording core means in succession to record the corresponding instantaneous values of signal flux on said magnetic record medium.

6. In a transducer system, a series of transduecr head units each comprising a magnetic core having a magnetic signal flux path for coupling with a respective portion of a magnetic record medium, signal coupling means coupled to the signal flux path of each of said magnetic cores for transducing between a magnetic signal flux in said signal flux path and an electric signal current in said signal coupling means, excitation coupling means coupled to each of said cores, and means for delivering excitation pulses to the excitation coupling means of the respective cores in succession for successively activating said head units for a transducing operation.

7. In a transducer system, a series of transducer head units each comprising a magnetic core having a magnetic signal flux path for coupling with a respective portion of a magnetic record medium, signal coupling means coupled to the signal flux path of each of said magnetic cores for transducing between a magnetic signal flux in said signal flux path and an electric signal current in said signal coupling means, excitation coupling means coupled to each of said cores, and means for delivering excitation pulses to the excitation coupling means of the respective cores in succession for successively activating said head units for a transducing operation, said cores each having first and second variable reluctance portions of magnetic material in said signal flux path, and said excitation pulse delivering means producing pulses of opposite polarity in the respective first and second portions with respect to said signal flux path.

8. In a transducer system, a series of transducer head units each comprising a magnetic core having a magnetic signal flux path for coupling with a respective portion of a magnetic record medium, signal coupling means coupled to the signal flux path of each of said magnetic cores for transducing between a magnetic signal flux in said signal flux path and an electric signal current in said signal coupling means, excitation coupling means coupled to each of said cores, and means for delivering excitation pulses to the excitation coupling means of the respective cores in succession for successively activating said head units for a transducing operation, said excitation pulse delivering means comprising means for generating an alternating square wave for each of the respective cores which are successively out of phase to activate said cores in succession.

9. In a transducer system, a series of transducer head units each comprising a magnetic core having a magnetic signal flux path for coupling with a respective portion of a magnetic record medium, signal coupling means coupled to the signal flux path of each of said magnetic cores for transducing between a magnetic signal flux in said signal flux path and an electric signal current in said signal coupling means, excitation coupling means coupled to each of said cores, and means for delivering excitation pulses to the excitation coupling means of the respective cores in succession for successively activating said head units for a transducing operation, said cores each having first and second variable reluctance portions of magnetic material having a maximum flux capacity of the order of three times the maximum flux capacity of the record medium coupled to said cores, and said excitation pulse delivering means producing pulses in the respective variable reluctance portions of opposite polarity with respect to said signal flux path.

10. In a transducer system, a series of transducer head units each comprising a magnetic core having a magnetic signal flux path for coupling with a respective portion of a magnetic record medium, signal coupling means coupled to the signal flux path of each of said magnetic cores for transducing between a magnetic signal flux produced in said signal flux path by said magnetic record medium and an electric signal current produced in said signal coupling means by said magnetic signal flux, excitation coupling means coupled to each of said cores, and means for delivering excitation pulses to the excitation coupling means of the respective cores in succession, said pulses being operative to change the magnetic condition of the respective magnetic cores substantially more abruptly than said signal flux to produce a substantially greater change in electric current flow in said signal coupling means than that produced by the signal flux in the absence of said excitation pulses.

11. In a transducer system, a series of transducer head units each comprising a magnetic core having a magnetic signal flux path for coupling with a respective portion of a magnetic record medium, signal coupling means coupled to the signal flux path of each of said magnetic cores for transducing between a magnetic signal flux produced in said signal flux path by said magnetic record medium and an electric signal current produced in said signal coupling means by said magnetic signal flux, excitation coupling means coupled to each of said cores, and means for delivering excitation pulses to the excitation coupling means of the respective cores in succession, said pulses being operative to change the magnetic condition of the respective magnetic cores substantially more abruptly than said signal flux to produce a substantially greater change in electric current flow in said signal coupling means than that produced by the signal flux in the absence of said excitation pulses, said excitation pulse delivering means delivering an alternating square wave to the excitation coupling means of each of said cores which are successively out of phase to successively pulse the respective cores.

12. A transducer system comprising a transducer head having a magnetic core defining a magnetic signal flux path for coupling with a magnetic record medium, signal coupling means coupled to the signal flux path of said core for transducing between a magnetic signal flux threading said signal flux path and an electric signal current in said signal coupling means, excitation coupling means coupled to said core, and means for abruptly changing the magnetic condition of a portion of said core in comparison to the rate of change of signal flux in said signal flux path comprising means for supplying an alternating square wave form current to said excitation coupling means.

13. A transducer system comprising a transducer head having a magnetic core defining a magnetic signal flux path for coupling with a magnetic record medium, signal coupling means coupled to the signal flux path of said core for transducing between a magnetic signal flux threading said signal flux path and an electric signal current in said signal coupling means, excitation coupling means coupled to said core, and means for abruptly changing the magnetic condition of a portion of said core in comparison to the rate of change of signal flux in said signal flux path comprising means for supplying an alternating square wave form current to said excitation coupling means, said excitation coupling means comprising oppositely poled means coupled to respective portions of said signal flux path, and means for balancing the excitation pulses produced by said excitation coupling means with respect to said signal coupling means to produce a minimum net energy from said head in the absence of a signal applied to said head.

14. In a recording system, a series of recording head units each comprising recording core means cooperating with a respective portion of a magnetic record medium, signal coupling means coupled to each of said recording core means, recording signal source means connected to said signal coupling means for delivering a signal to said signal coupling means and for producing a corresponding signal flux in each of said recording core means simultaneously, said signal source means producing a signal flux in each of said recording core means which is of too low an amplitude at the magnetic record medium to be effectively re-recorded thereon, excitation means coupled to said recording core means for producing opposed exciting pulses of magnetic flux in each of the recording core means which are sufficiently balanced in the absence of a signal flux to prevent effective recording of the pulses on the record medium, said recording core means producing an unbalanced condition between the opposed exciting pulses in response to the presence of signal flux therein, and means for energizing the excitation means of said recording core means in succession to produce said opposed exciting pulses therein and thereby to record the successive instantaneous values of signal on said magnetic record medium.

15. In a recording system, a series of recording head units each comprising recording core means having a gap for coupling to a respective portion of a magnetic record medium, signal coupling means coupled to each of said recording core means, recording signal source means connected to said signal coupling means for delivering a signal to said signal coupling means and producing a corresponding signal flux in each of said recording core means simultaneously, said signal source means producing a signal flux in each of said recording core means which is of too low an amplitude at the gap to be effectively recorded on the magnetic record medium, a pair of excitation windings on each of the recording core means for producing excitation pulses of magnetic flux which are opposed and substantially balanced with respect to the corresponding gap except for the presence of a signal flux in said core means, and means for supplying current pulses to the pairs of excitation windings of the respective recording core means in succession to produce said opposed excitation pulses in the successive recording core means and thereby to record the corresponding instantaneous values of signal on the magnetic record medium.

References Cited by the Examiner

UNITED STATES PATENTS

| | | | |
|---|---|---|---|
| 2,608,621 | 8/52 | Peterson | 179—100.2 |
| 2,722,569 | 11/55 | Loper | 179—100.2 |
| 2,905,770 | 9/59 | Kornei | 340—174.1 |
| 2,915,597 | 12/59 | Wanlass et al. | 340—174.1 |
| 2,927,304 | 3/60 | Paquin | 340—174.1 |
| 2,941,190 | 6/60 | Lindley | 340—174.1 |

FOREIGN PATENTS

| | | |
|---|---|---|
| 158,890 | 9/54 | Australia. |

IRVING L. SRAGOW, *Primary Examiner.*

STEPHEN W. CAPELLI, BERNARD KONICK, *Examiners.*